United States Patent
Cao

(10) Patent No.: US 9,774,767 B2
(45) Date of Patent: Sep. 26, 2017

(54) DIGITAL MEMORY CARD WINDOW ARRANGEMENT FOR IP CAMERA

(71) Applicant: Jianhua Cao, Walnut, CA (US)

(72) Inventor: Jianhua Cao, Walnut, CA (US)

(*) Notice: Subject to any disclaimer, the term of this patent is extended or adjusted under 35 U.S.C. 154(b) by 43 days.

(21) Appl. No.: 14/953,401

(22) Filed: Nov. 29, 2015

(65) Prior Publication Data

US 2017/0155806 A1    Jun. 1, 2017

(51) Int. Cl.
| | |
|---|---|
| H04N 5/225 | (2006.01) |
| H04L 29/08 | (2006.01) |
| H04N 5/232 | (2006.01) |
| H04N 1/00 | (2006.01) |
| H04N 1/21 | (2006.01) |
| H04N 7/18 | (2006.01) |

(52) U.S. Cl.
CPC .......... H04N 5/2252 (2013.01); H04L 67/02 (2013.01); H04N 1/00209 (2013.01); H04N 1/00244 (2013.01); H04N 1/2158 (2013.01); H04N 5/23206 (2013.01); H04N 7/183 (2013.01)

(58) Field of Classification Search
CPC .... H04N 5/2251–5/2252; H04N 5/907; H04N 2201/0058; H04N 2201/0056; H04N 2201/0049; H04N 2201/0044; H04N 2201/0063; H04N 1/00538; H04N 1/00519; G03B 17/08; G03B 17/00; G03B 17/02; G03B 2217/002; G03B 2217/268; A45C 11/38
See application file for complete search history.

(56) References Cited

U.S. PATENT DOCUMENTS

| | | | | |
|---|---|---|---|---|
| 6,138,826 A * | 10/2000 | Kanamori | ............... | A45C 11/38 206/316.2 |
| 6,148,155 A * | 11/2000 | Yasumaru | ............... | G03B 17/30 396/536 |
| 7,538,792 B2 * | 5/2009 | Takahashi | .......... | H04N 1/00204 348/207.1 |
| 7,719,613 B2 * | 5/2010 | Kayanuma | ......... | H04N 1/00204 348/207.1 |
| 2002/0186317 A1 * | 12/2002 | Kayanuma | ......... | H04N 1/00204 348/373 |
| 2003/0011690 A1 * | 1/2003 | Uryu | .................. | H04N 1/00037 348/231.7 |
| 2003/0071915 A1 * | 4/2003 | Kanamori | .......... | H04N 1/00519 348/375 |
| 2003/0185547 A1 * | 10/2003 | Kikuchi | ................. | H04N 5/772 386/323 |
| 2004/0214482 A1 * | 10/2004 | Ariga | ................... | H04N 5/2251 439/894 |
| 2004/0242220 A1 * | 12/2004 | Matsunaga | ...... | G08B 13/19656 455/423 |

(Continued)

*Primary Examiner* — Michael Osinski
(74) *Attorney, Agent, or Firm* — Raymond Y. Chan; David and Raymond Patent Firm

(57) ABSTRACT

An Internet protocol (IP) camera includes a housing having a capturing window, a capturing unit received in the housing for capturing images as data sets through the capturing window, and a card window arrangement which includes a card slot unit for replaceably receiving a digital memory card to store the data sets therein and a concealing cover detachably coupled at the housing to conceal the card slot unit in a waterproof and dustproof manner without disassembling the housing.

7 Claims, 3 Drawing Sheets

(56) References Cited

U.S. PATENT DOCUMENTS

| | | | | |
|---|---|---|---|---|
| 2005/0117052 A1* | 6/2005 | Willes | H04N 5/2251 | 348/375 |
| 2005/0237398 A1* | 10/2005 | Fujii | H04N 1/00127 | 348/231.99 |
| 2007/0038020 A1* | 2/2007 | Tien | A61B 1/00105 | 600/101 |
| 2007/0269196 A1* | 11/2007 | Misawa | G03B 13/18 | 396/123 |
| 2007/0300272 A1* | 12/2007 | Takanezawa | H04N 7/17318 | 725/105 |
| 2008/0252752 A1* | 10/2008 | Kosaka | H04N 5/2252 | 348/231.99 |
| 2008/0309772 A1* | 12/2008 | Ikeda | G03B 5/00 | 348/208.7 |
| 2009/0102925 A1* | 4/2009 | Sheard | H04N 5/2252 | 348/164 |
| 2009/0202232 A1* | 8/2009 | Kawakami | G03B 17/08 | 396/27 |
| 2012/0243854 A1* | 9/2012 | Takimoto | G01M 3/3272 | 396/26 |
| 2013/0016960 A1* | 1/2013 | Yang | G03B 17/08 | 396/25 |
| 2014/0240493 A1* | 8/2014 | Bang | G08B 13/19695 | 348/143 |
| 2015/0002721 A1* | 1/2015 | Ujiie | G03B 17/04 | 348/333.06 |
| 2015/0189176 A1* | 7/2015 | Pacurariu | H04N 7/183 | 348/143 |
| 2015/0201123 A1* | 7/2015 | Koguchi | H04N 5/23212 | 348/239 |
| 2016/0142778 A1* | 5/2016 | Moribe | H04N 21/21805 | 725/90 |
| 2016/0374190 A1* | 12/2016 | Tolbert | H05K 1/0209 | |

* cited by examiner

DIGITAL MEMORY CARD WINDOW ARRANGEMENT FOR IP CAMERA

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an apparatus for image capturing, and more particular to a SD card window Arrangement for IP camera, which provides a waterproof and dustproof ability for enclosing the SD card in the IP camera.

Description of Related Arts

Surveillance camera has been configured into Internet camera, such as IP camera or network camera, to provide an alternative way for people to conveniently monitor various areas. For example, an indoor surveillance camera is located within a building, such that the user is able to conveniently check in on their pets at home from their desk at work or to monitor their business from their computer at home in real time. An outdoor surveillance camera requires durable structure to protect the electronic components from moisture and precipitation and extremes in temperature. In particular, the housing of the surveillance camera must protect the internal electronic components from water and dust damage. In particular, once the IP camera is configured to connect to the Internet, the IP camera allow people to view the live video remotely by any Internet-enabled electronic device such as personal computer, laptop, tablet, or mobile phone.

In addition to Internet service, IP camera requires an electrical power supply remained in connection, an Internet environment, such as DSL connection, Wi-Fi environment, mobile Internet, and etc., and an IP address in order to enable the connection between the IP camera and the Internet. Therefore, each IP camera has its own IP address in order to link to the Internet. However, the configuration of IP camera is complexity that the user must have a certain level of communicative information technology to look for the IP address assigned on a network. Generally speaking, when the computer is connected to the network through Internet each time, an IP address will be automatically assigned. However, most users are unable to search for the IP address or are unsure whether the assigned IP address is the static IP address. Accordingly, the general consumers must call the technical support of the Internet service provider for help. It is time consuming for the user to configure the IP camera before it is operated. When one of the configuring steps of the IP camera is uncorrected, the IP camera will not be worked as advertised. It is worth mentioning that most Internet service providers supply dynamic IP address to the customers, wherein the dynamic IP address will be changed frequently. Therefore, before the setup of the IP camera, the user must confirm whether the IP address from the Internet service provider is the static IP address or the dynamic IP address. Generally, the user will have to pay additional monthly fee to the Internet service provider in order to obtain the static IP address.

Another drawback of the IP camera is that the capturing image must be stored in the Internet-enabled electronic device such as personal computer, laptop, tablet, or mobile phone through the Internet environment. In other words, the user must install or downward a corresponding application in the Internet-enabled electronic device. Accordingly, another configuration of the application is required for connecting the Internet-enabled electronic device with the corresponding IP camera. It is worth mentioning that when the user wants to view and save the live video from the IP camera by different electronic devices, the application must be installed into each electronic device. For example, if the user wants to access the IP camera by the laptop, tablet and mobile phone, the application must be individually installed into all the laptop, tablet and mobile phone while the configuration of the application must be individually setup in the laptop, tablet, and mobile phone. As a result, once the internet connection is down, the live video will not be saved at all. Some web-based service providers set up the server for multiple users to register and upload their video records of their IP cameras so that the users may access the video records from the servers via Internet by logging in the web site designated by the service provider. However, such public server must be a system that is big and powerful enough for keeping huge memories, disk space and bandwidth of video records and multi-million users to access at the same time. It is complicated and costly and thus generally requires the users to pay expensive membership fee to receive such service.

SUMMARY OF THE PRESENT INVENTION

The invention is advantageous in that it provides a digital memory card window arrangement for IP camera, which provides a waterproof and dustproof ability for enclosing the SD card in the IP camera.

Another advantage of the invention is to a digital memory card window arrangement for IP camera, wherein the concealing cover is detachably coupled at the housing to conceal the digital memory card in the card slot unit in a waterproof and dustproof manner without disassembling the housing.

Another advantage of the invention is to a digital memory card window arrangement for IP camera, wherein the concealing cover is detachably coupled at the housing at the card slot window in a tool-less manner.

Another advantage of the invention is to a digital memory card window arrangement for IP camera, wherein the digital memory card replacement through the SD card window arrangement is simple and easy, such that the operator does not require to disassemble the housing which will expose the capturing device with a chance of getting damaged accidentally.

Another advantage of the invention is to a digital memory card window arrangement for IP camera, which does not require altering the original structural design of the IP camera and the manufacturing process of the digital memory card window arrangement is simple and easy, so as to minimize the manufacturing cost of the IP camera with the built-in SD card window arrangement.

Another advantage of the invention is to a digital memory card window arrangement for IP camera, wherein no expensive or complicated structure is required to employ in the present invention in order to achieve the above mentioned objects. Therefore, the present invention successfully provides an economic and efficient solution for providing a SD card window arrangement with waterproof and dustproof ability to protect the digital memory card.

Additional advantages and features of the invention will become apparent from the description which follows, and may be realized by means of the instrumentalities and combinations particular point out in the appended claims.

According to the present invention, the foregoing and other objects and advantages are attained by an Internet protocol (IP) camera, comprising:

a housing having a capturing window;

a capturing unit received in the housing for capturing images as data sets through the capturing window; and a card window arrangement which comprises a card slot unit for replaceably receiving a digital memory card to store the data sets therein and a concealing cover detachably coupled at the housing to conceal the card slot unit in a waterproof and dustproof manner without disassembling the housing.

In accordance with another aspect of the invention, the present invention comprises a surveillance system, comprising a remote control center and one or more Internet protocol (IP) cameras.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
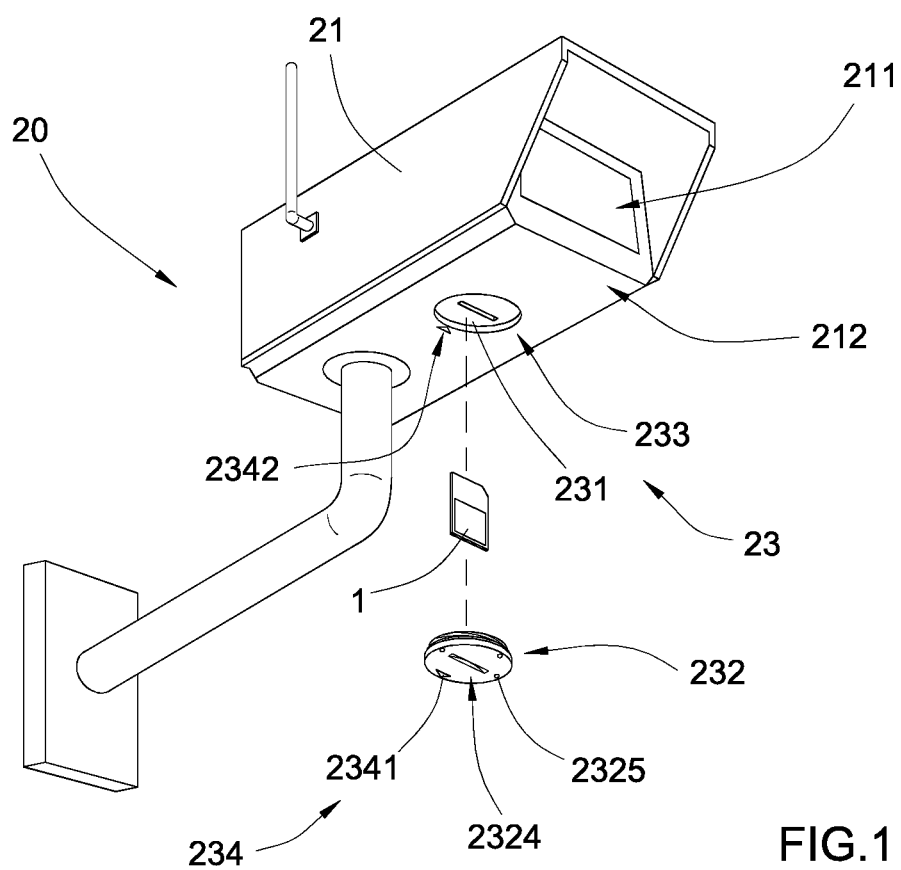
FIG. 1 is a perspective view of a surveillance system according to a preferred embodiment of the present invention.
Figure 2:
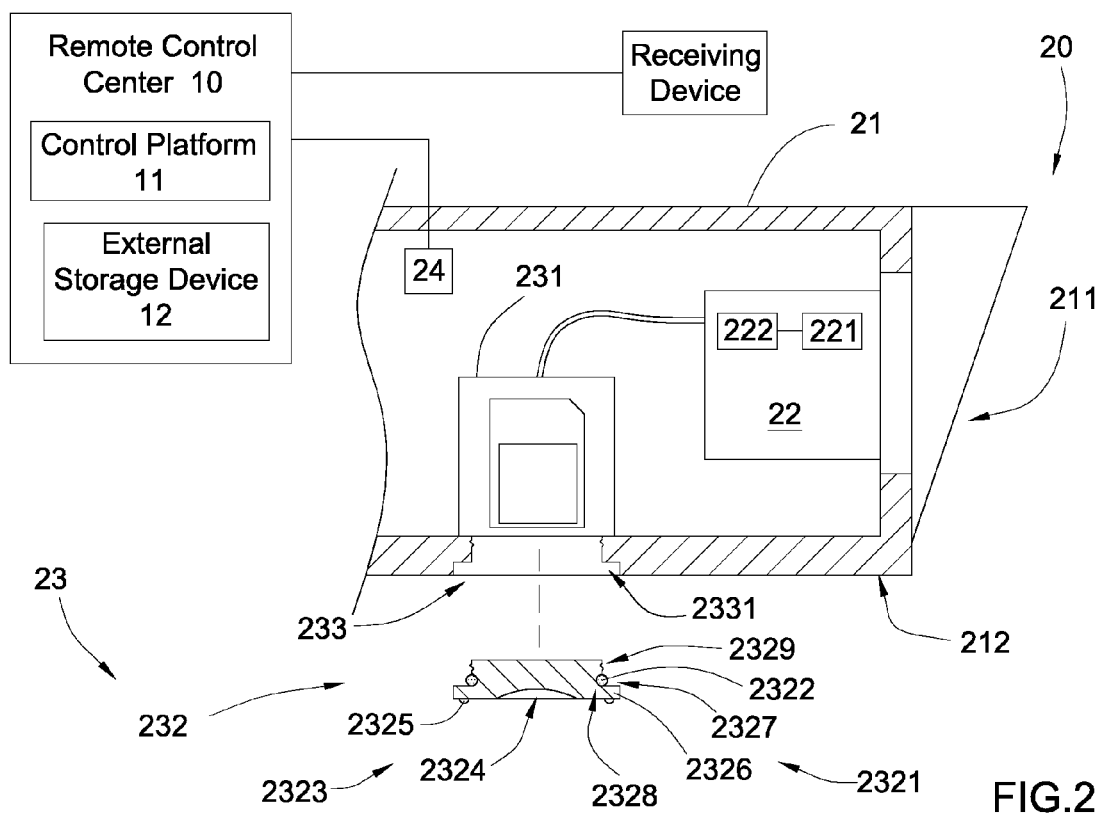
FIG. 2 is a sectional view of an IP camera of the surveillance system according to the above preferred embodiment of the present invention.

Referring to FIGS. 1 and 2 of the drawings, a surveillance system according to a preferred embodiment of the present invention is illustrated, wherein the surveillance system comprises a remote control center 10 and one or more Internet protocol (IP) cameras 20, especially the outdoor IP camera.

According to the preferred embodiment, each IP camera 20 comprises a housing 21 having a capturing window 211, a capturing unit 22 received in the housing 21, and a card window arrangement 23.

The housing 21 comprises an exterior wall 212 defining a receiving cavity therein to house the capturing unit 22. Accordingly, the housing 21 can be suspendedly mounted at a supporting surface, such as wall surface or ceiling, or can be supported on a ground surface, such as tabletop. In particular, the capturing window 211 is a transparent window that can be seen through the receiving cavity of the housing 21. Preferably, the housing 21 should be made of waterproof and durable material.

The capturing unit 22 can be placed at any desired location via the mounting of the housing 21, wherein the capturing unit 22 can be a surveillance camera, a digital camera, a web camera, a video recorder, and/or an audio recorder for capturing image content, video content, audio content or other parameters. In particular, the capturing unit 22 comprises a camera lens 221 for capturing images through the capturing window 211 of the housing 21 and a capturing circuit 222 for converting the images into as data sets.

Accordingly, the capturing unit 22 is installed into and is enclosed within the housing 21 in a fixed position, wherein the housing 21 should not be disassembled at anytime to expose the capturing unit 22. In other words, the orientation of the capturing unit 22 is preset in the housing 21 to ensure the images to be captured by the capturing unit 22 through the capturing window 211 of the housing 21.

As shown in FIGS. 1 and 2, the card window arrangement 23 comprises a card slot unit 231 received in the housing 21 for replaceably receiving a digital memory card 1 to store the data sets therein and a concealing cover 232 detachably coupled at the housing 21 to conceal the card slot unit 231 in a waterproof and dustproof manner without disassembling the housing 21. In other words, when the concealing cover 232 is detached from the housing 21, the card slot unit 231 is exposed for accessing to replace the digital memory card 1 therefrom.

Accordingly, the card slot unit 231 comprises a card reader to read and write the digital memory card 1 as a digital memory element having a predetermined memory capacity, preferably SD card, such that the data sets can be stored in the digital memory card 1 via the card slot unit 231.

According to the preferred embodiment, the card window arrangement 23 has a card slot window 233 formed at the exterior wall 212 of the housing 21 at a position away from the capturing window 211 to communicate with the card slot unit 231. As shown in FIGS. 1 and 2, the card slot window 233 is a through window formed on the exterior wall 212 of the housing 21 preferably at the bottom side thereof, wherein the concealing cover 232 is detachably coupled at the card slot window 233 to conceal the card slot unit 231. It is worth mentioning that the size of the card window 233 matches with the concealing cover 232.

As shown in FIGS. 1 and 2, the concealing cover 232 comprises a cover body 2321 and a sealing element 2322 encircling around a peripheral edge of the cover body 2321 to seal at a surrounding rim of the card slot window 233. Therefore, when the sealing element 2322 is sealed with the surrounding rim of the card slot window 233, the cover body 2321 will cover up the card slot window 233 to enclose the card slot unit 231 in the housing 21 so as to protect the card slot unit 231 from water and dust damage. Preferably, the cover body 2321 is made of the same material of the housing 21.

In particular, the cover body 2321 has an enlarged top covering portion 2326 and a neck holding portion 2327 downwardly extended therefrom. A diameter size of the top covering portion 2326 is larger than a diameter size of the neck holding portion 2327. Furthermore, the neck holding portion 2327 is coaxially extended from the top covering portion 2326.

As shown in FIG. 2, the card window arrangement 23 further has an annular cavity 2331 indented on the exterior wall 212 of the housing 21 at the surrounding rim of the card slot window 233, wherein the top covering portion 2326 of the cover body 2321 is received at the annular cavity 2331 when the concealing cover 232 is coupled on the exterior wall 212 of the housing 21 to conceal the card slot unit 231 therein.

The sealing element 2322 is encircled around the neck holding portion 2327 to seal at the surrounding rim of the card slot window 233. In particular, the cover body 2321 further has an indentation slot 2328 formed at the neck holding portion 2327 to receive the sealing element 2322 therearound. Accordingly, the indentation slot 2328 has a concave configuration indented on the circumferential surface of the neck holding portion 2327, wherein an inner circumferential portion of the sealing element 2322 is received along the indentation slot 2328 while an outer circumferential portion of the sealing element 2322 is radially protruded out of the circumferential surface of the neck holding portion 2327 to seal at and bias against the inner circumferential surface of the surrounding rim of the card slot window 233.

As shown in FIG. 2, the cover body 2321 further has a base engaging portion 2329 downwardly extended from the neck holding portion 2327 and rotatably engaged with the surrounding rim of the card slot window 233 via a threaded structure. Accordingly, the neck holding portion 2327 is formed between the top covering portion 2326 and the base engaging portion 2329. The threaded structure refers to an outer threaded section formed at an outer circumferential surface of the base engaging portion 2329 and an inner threaded section formed at the inner circumferential surface of the surrounding rim of the card slot window 233, such that the base engaging portion 2329 is rotatably engaged with the surrounding rim of the card slot window 233 to detachably couple the concealing cover 232 at the housing 21 to seal and enclose the card slot window 233. It is worth mentioning that the sealing element 2322 is arranged to bias against and seal at the inner circumferential surface of the surrounding rim of the card slot window 233.

As shown in FIGS. 1 and 2, the concealing cover 232 further comprises a manipulating member 2323 integrated with the cover body 2321. The manipulating member 2323 has a manipulating slot 2324 indentedly formed on the outer surface of the cover body 2321, wherein the manipulating slot 2324 is an elongated slot formed at a diameter line of the cover body 2321, such that the operator is able to insert a finger tip at the manipulating slot 2324 to drive the cover body 2321 to be removed from the housing 21. In this embodiment, the operator is able to insert the finger tip at the manipulating slot 2324 to rotate the cover body 2321 for attaching to or detaching from the housing 21. The manipulating member 2323 further has a plurality of manipulating protrusions 2325 spacedly protruded from the outer surface of the cover body 2321, wherein the manipulating protrusions 2325 are protruded from the peripheral portion of the cover body 2321 to increase the surface contacting area thereof. Therefore, the operator is able grip the manipulating protrusions 2325 and rotate the cover body 2321 to be attached to or detached from the housing 21. Preferably, the concealing cover 232 is coupled at the exterior wall 212 of the housing 21 with less than one revolution. It is worth mentioning that the attaching/detaching operation of the concealing cover 232 to the housing 21 without any tool and without exposing the capturing unit 22 out of the housing 21. In particular, the capturing unit 22 is remained untouched in the housing 21 when attaching/detaching the concealing cover 232 to the housing 21. Without disassembling the housing 21, the fixed location of the capturing unit 22 will be remained to prevent any accidentally damage of the capturing unit 22 or any misalignment of the capturing unit 22 with the capturing window 211.

The card window arrangement 23 further comprises an indication unit 234 for indicating the corrected alignment of the concealing cover 232, wherein the indication unit 234 has a first indication mark 2341 formed at the outer surface of the cover body 2321 and a second indication mark 2342 formed at the exterior wall 212 of the housing 21 adjacent to the card slot window 233. When the concealing cover 232 is rotated to align the first indication mark 2341 with the second indication mark 2341, the concealing cover 232 is coupled at the exterior wall 212 of the housing 21 with the corrected alignment so as to ensure the card slot unit 231 to be concealed in the housing 21 by the concealing cover 232 in a waterproof and dustproof manner. It is worth mentioning that the first indication mark 2341 can serve as one of the manipulating protrusions 2325 protruded from the outer surface of the cover body 2321.

According to the preferred embodiment, the remote control center 10 is arranged to operatively link to the IP camera 20 through Internet, wherein the remote control center 10 is embodied as an Internet-based server that the user is able to access the remote control center 10 through Internet or any web browser, such as "Google Chrome" or "Safari" from different operating systems. Accordingly, the remote control center 10 allows a receiving device to access the IP camera 20, wherein the receiving device is an Internet-enabled computerizing device, such as a personal computer, a notebook computer, a tablet, a iPad, and a mobile phone, such that the operator is able to use the receiving device to link with the remote control center 10 through Internet.

The remote control center 10 comprises a control platform 11 that selectively adjusts a resolution of the images being captured by the capturing unit 22 and edits the data sets stored in the digital memory card 1 through Internet. In other words, the operator is able to use the receiving device to access the control platform 11 of the remote control center 10 for controlling the operation of the IP camera 20 and for configuring the setting of the IP camera 20. In addition, the operator is able to use the receiving device to access the control platform 11 of the remote control center 10 for editing the data sets stored in the digital memory card 1, such as deleting the data sets or copying the data sets to any desired location.

The remote control center 10 further comprises an external storage device 12 that stores said data sets sent out from the IP camera 20 through Internet. In other words, the data sets can be backup in the external storage device 12. It is worth mentioning that the operator is able to access the control platform 11 via the receiving device, such that the control platform 11 can selectively configure the data sets to be stored in at least one of the digital memory card 1 in the IP camera 20 and the external storage device 12. In other words, the data sets can be only saved in the digital memory card 1 or can be saved in both the digital memory card 1 and the external storage device 12. It is worth mentioning that the storage device 12 can be a hard disk installed into the computerizing device or a cloud storage being pre-setup by the operator. The hard disk can be located in the remote control center 10 or in the receiving device.

Correspondingly, each IP camera 20 further comprises a network interface 24 operatively linked to the capturing device 22 and configured for linking with the external storage device 12 through Internet to wirelessly send the data sets to the external storage device 12.

Figure 3:
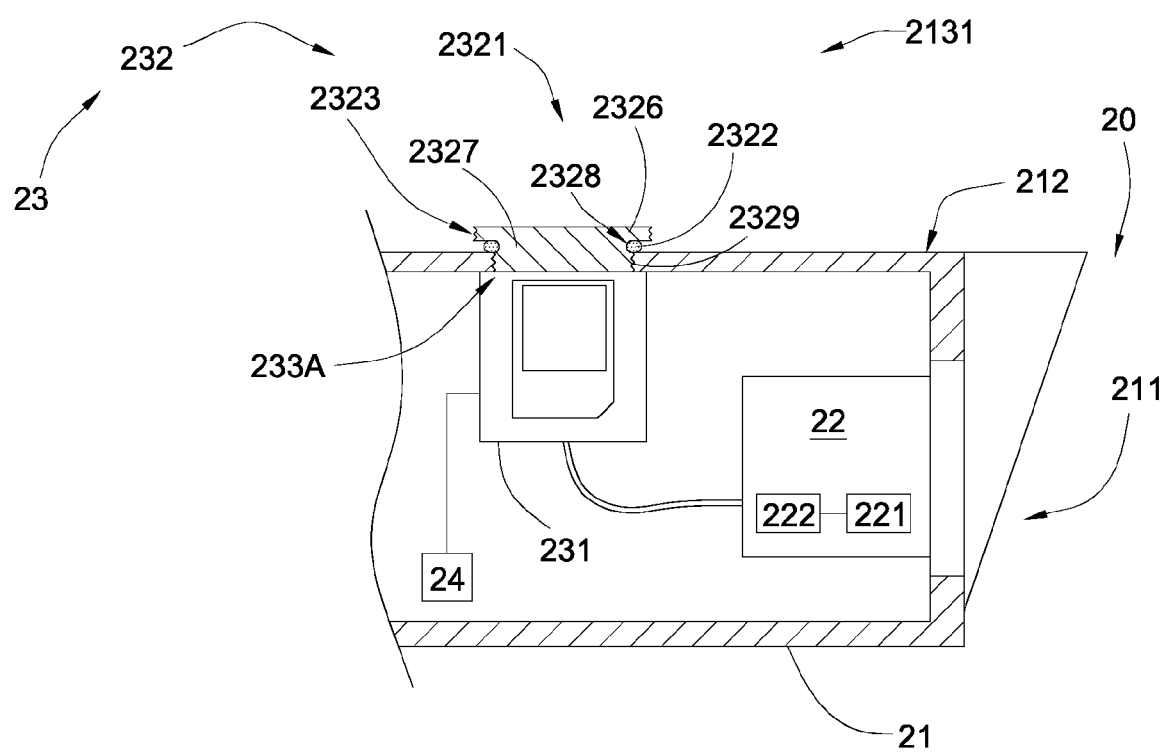
FIG. 3 illustrates an alternative mode of the card window arrangement of the IP camera of the surveillance system according to the above preferred embodiment of the present invention.

FIG. 3 illustrates an alternative mode of the card slot window 233A which is formed at the exterior wall 212 of the housing 21 at a position away from the capturing window 211 to communicate with the card slot unit 231. As shown in FIG. 3, the card slot window 233A is a through window formed on the exterior wall 212 of the housing 21 at the top side thereof, wherein the concealing cover 232 is detachably coupled at the card slot window 233A to conceal the card slot unit 231. It is worth mentioning that the card slot window 233A can be formed on the exterior wall 212 of the housing 21 at the top side, bottom side, or one of sidewalls thereof.

According to the preferred embodiment, the sealing element 2322 is encircled around the neck holding portion 2327 to seal at the surrounding rim of the card slot window 233. In particular, the indentation slot 2328 is formed at the neck holding portion 2327 to receive the sealing element 2322 therearound. In addition, the base engaging portion 2329 is downwardly extended from the neck holding portion 2327 and rotatably engaged with the surrounding rim of the card slot window 233 via a threaded structure.

According to the preferred embodiment, the threaded structure refers to an outer threaded section formed at an outer circumferential surface of the base engaging portion 2329 and an inner threaded section formed at the inner circumferential surface of the surrounding rim of the card slot window 233A. When the base engaging portion 2329 is rotatably engaged with the surrounding rim of the card slot window 233A, the sealing element 2322 is driven to seal at the exterior wall 212 of the housing 21 for sealing at the card slot window 233 so as to detachably couple the concealing cover 232 at the housing 21 to seal and enclose the card slot window 233A.

As shown in FIG. 3, the concealing cover 232 further comprises a manipulating member 2323 integrated with the cover body 2321. The manipulating member 2323 has a plurality of manipulating teeth 2324A integrally formed at a peripheral edge of the cover body 2321, such that the operator is able to hold and grip the manipulating teeth 2324A to drive the cover body 2321 to be removed from the housing 21.

It is worth mentioning that the attaching/detaching operation of the concealing cover 232 to the housing 21 without any tool and without exposing the capturing unit 22 out of the housing 21. In particular, the capturing unit 22 is remained untouched in the housing 21 when attaching/detaching the concealing cover 232 to the housing 21. Without disassembling the housing 21, the fixed location of the capturing unit 22 will be remained to prevent any accidentally damage of the capturing unit 22 or any misalignment of the capturing unit 22 with the capturing window 211.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An Internet protocol (IP) camera, comprising:
a housing having a capturing window;
a capturing unit received in said housing for capturing images as data sets through said capturing window; and
a card window arrangement which comprises a card slot unit for replaceably receiving a digital memory card to store said data sets therein and a concealing cover detachably coupled at said housing to conceal said card slot unit in a waterproof and dustproof manner without disassembling said housing, wherein said card window arrangement has a card slot window formed at an exterior wall of said housing at a position away from said capturing window to communicate with said card slot unit, wherein said concealing cover is detachably coupled at said card slot window to conceal said card slot unit, wherein said concealing cover comprises a cover body and a sealing element encircling around a peripheral edge of said cover body to seal at a surrounding rim of said card slot window, wherein said cover body has an enlarged top covering portion and a neck holding portion downwardly extended therefrom, wherein said sealing element is encircled around said neck holding portion to seal at said surrounding rim of said card slot window, wherein said cover body further has an indentation slot formed at said neck holding portion to receive said sealing element therearound.

2. The IP camera, as recited in claim 1, wherein said cover body further has a base engaging portion downwardly extended from said neck holding portion and rotatably engaged with said surrounding rim of said card slot window via a threaded structure.

3. The IP camera, as recited in claim 1, wherein said card slot window is formed at said exterior wall of said housing at a bottom side thereof.

4. The IP camera, as recited in claim 2, wherein said card slot window is formed at said exterior wall of said housing at a bottom side thereof.

5. The IP camera, as recited in claim 1, further comprising a network interface operatively linked to said capturing device and configured for linking with an external storage device through Internet to wirelessly send said data sets to said external storage device.

6. The IP camera, as recited in claim 4, further comprising a network interface operatively linked to said capturing device and configured for linking, with an external storage device through Internet to wirelessly send said data sets to said external storage device.

7. An Internet protocol (IP) camera, comprising:
a housing having a capturing window;
a capturing unit received in said housing for capturing images as data sets through said capturing window; and
a card window arrangement which comprises a card slot unit for replaceably receiving a digital memory card to store said data sets therein and a concealing cover detachably coupled at said housing to conceal said card slot unit in a waterproof and dustproof manner without disassembling said housing, wherein said card window arrangement has a card slot window formed at an exterior wall of said housing at a position away from said capturing, window to communicate with said card slot unit, wherein said concealing cover is detachably coupled at said card slot window to conceal said card slot unit, wherein said concealing cover comprises a cover body and a sealing element encircling around a peripheral edge of said cover body to seal at a surrounding rim of said card slot window, wherein said cover body has an enlarged top covering portion and a neck holding portion downwardly extended therefrom, wherein said sealing element is encircled around said neck holding portion to seal at said surrounding rim of said card slot window, wherein said cover body further has a base engaging portion downwardly extended from said neck holding portion and rotatably engaged with said surrounding rim of said card slot window via a threaded structure.

\* \* \* \* \*